United States Patent [19]
Bartscher et al.

[11] Patent Number: 5,380,073
[45] Date of Patent: Jan. 10, 1995

[54] DUAL CIRCUIT BRAKE VALVE SYSTEM

[75] Inventors: Peter Bartscher, Hanover; Gerhard Martini, Gehrden; Wolfgang Pohl, Garbsen; Jürgen Sandmann, Wennigsen, all of Germany

[73] Assignee: WABCO Standard GmbH, Hanover, Germany

[21] Appl. No.: 125,068

[22] Filed: Sep. 21, 1993

[30] Foreign Application Priority Data

Sep. 25, 1992 [DE] Germany .............................. 4232146

[51] Int. Cl.6 .................................................. B60T 8/30
[52] U.S. Cl. .................................. 303/9.72; 188/349; 303/9.75
[58] Field of Search ..... 188/349; 303/9.62, 9.71–9.75, 303/113.5, 22.5

[56] References Cited

U.S. PATENT DOCUMENTS

| 3,804,468 | 4/1974 | Ishikawa et al. | 303/9.71 |
| 4,274,518 | 6/1981 | Berisch | 303/9.71 X |
| 4,335,736 | 6/1982 | Maehara et al. | 303/9.74 X |
| 4,365,845 | 12/1982 | Aouo | 303/9.74 |
| 4,660,894 | 4/1987 | Bartholomew et al. | 303/6.01 |

FOREIGN PATENT DOCUMENTS

| 0042087 | 12/1981 | European Pat. Off. . |
| 2737628 | 2/1979 | Germany . |
| 2825559 | 12/1979 | Germany . |
| 2820107 | 3/1980 | Germany . |
| 3045953 | 7/1982 | Germany . |
| 3023482 | 1/1983 | Germany . |
| 3402499 | 7/1985 | Germany . |
| 3439086 | 5/1986 | Germany . |
| 3717783 | 12/1988 | Germany . |
| 3830105 | 3/1990 | Germany . |
| 71648 | 6/1981 | Japan | 303/9.74 |
| 20549 | 2/1983 | Japan | 303/9.74 |
| 2172680 | 9/1986 | United Kingdom . |

Primary Examiner—Robert J. Oberleitner
Assistant Examiner—Alfred Muratori
Attorney, Agent, or Firm—Meltzer, Lippe, Goldstein et al.

[57] ABSTRACT

A dual circuit brake valve system comprises first and second brake circuits, first and second combined inlet and outlet valves through which first and second braking pressures respectively are delivered to said first and second brake circuits, and first and second pistons which actuate the first and second combined inlet and outlet valves respectively. The second piston is actuated by the first braking pressure which serves as a control pressure therefor. To achieve simultaneous actuation of the first and second combined inlet and outlet valves, a compression spring is installed between the first and second pistons and mechanically connects these to each other. Thereby, a pressure difference of Δp between the pressure in the first brake circuit and the pressure in the second brake circuit, which approaches zero, is achieved. In order to be able to increase the pressure difference Δp in the two brake circuits, a third piston is provided between the first and second pistons. The third piston is subjected to braking pressure from the first brake circuit in such a manner that the third piston compresses the compression spring when a predetermined level of pressure is reached in the first brake circuit, thereby causing the mechanical connection between the first piston and the second piston to be suspended.

13 Claims, 2 Drawing Sheets

DUAL CIRCUIT BRAKE VALVE SYSTEM

BACKGROUND OF THE INVENTION

The invention relates to a dual circuit brake valve system for a vehicle brake system actuated by compressed air or the like.

A dual circuit brake valve system of this type is known from DE 34 39 086 A1.

In the known brake valve system a compression spring is provided between a first piston, which serves to control the pressure in the first brake circuit, and a second piston, which serves to control the pressure in the second brake circuit, whereby the second piston is actively connected to the first piston via said compression spring. When the first piston moves in the direction of a first combined inlet and outlet valve of the valve arrangement, the second piston is also moved in the direction of a second combined inlet and outlet valve of the valve arrangement. When the valve arrangement is actuated, the interaction between the two pistons via the compression spring compensates to the greatest possible extent for the friction caused by the sealing rings on the second piston and the force of a spring acting upon the valve body of the second combined inlet and outlet valve. Thanks to this measure, the second piston is able to react more rapidly to the control pressure to which it is subjected so that a nearly simultaneous actuation of the two combined inlet and outlet valves is possible. The evolution of the pressure selected by the valve arrangement is identical for the entire pressure evolution in the first brake circuit and in the second brake circuit. The difference between the pressure in the first brake circuit and in the second brake circuit is constant for the entire pressure rise.

In order to avoid uneven wear of the brake linings of the wheels of a vehicle, the pressure difference Δp is kept as close to zero as possible.

A brake valve arrangement of the type mentioned initially is especially well-suited for vehicles with a dual circuit brake system in which the two circuits are operated with equally high pressure.

However, this known brake valve arrangement is not suitable for all dual circuit brake systems. In particular, in this known brake valve arrangement, pressures of equal force are injected into both brake circuits. This is not desirable in dual circuit brake systems wherein the pressure supplied to each of brake circuits is regulated as a function of the load.

It is the object of the instant invention to improve the known dual circuit brake valve installation in such manner that for an overall pressure increase in a braking process, the evolution of pressure in the second brake circuit is identical or nearly identical with the pressure evolution in the first brake circuit, and when the pressure is below a predetermined level, the pressure difference Δp between the pressure in the first brake circuit and in the second brake circuit is less than the pressure difference Δp after this predetermined pressure level has been exceeded in both brake circuits.

SUMMARY OF THE INVENTION

In accordance with the present invention, a dual circuit brake valve system comprises first and second brake circuits, first and second combined inlet and outlet valves through which first and second braking pressures respectively are delivered to said first and second brake circuits, and first and second pistons which actuate the first and second combined inlet and outlet valves respectively. The second piston is actuated by the first braking pressure which serves as a control pressure therefor. To achieve simultaneous actuation of the first and second combined inlet and outlet valves, a compression spring is installed between the first and second pistons and mechanically connects these to each other. Thereby, a pressure difference of Δp between the pressure in the first brake circuit and the pressure in the second brake circuit, which approaches zero, is achieved. In order to be able to increase the pressure difference Δp in the two brake circuits, a third piston is provided between the first and second pistons. The third piston is subjected to braking pressure from the first brake circuit in such a manner that the third piston compresses the compression spring when a predetermined level of pressure is reached in the first brake circuit, thereby causing the mechanical connection between the first piston and the second piston to be suspended.

The invention offers the advantage of maintaining a dual circuit brake valve system in which it is possible to actuate a pressure for the first brake circuit and for the second brake circuit for which the pressure build-up follows an identical or nearly identical pressure evolution, with the pressure difference Δp between the pressure of the first brake circuit and the pressure of the second brake circuit being zero or approaching zero as a braking process is initiated and increasing when a predetermined pressure level has been exceeded in both brake circuits.

The change in pressure difference Δp is made possible by suspending the mechanically active connection between the first piston and the second piston when the pressure in the first brake circuit exceeds the predetermined value.

BRIEF DESCRIPTION OF THE DRAWINGS

An embodiment of the invention is explained in greater detail below through the drawings, wherein.

DETAILED DESCRIPTION OF A PREFERRED EMBODIMENT

Figure 1:
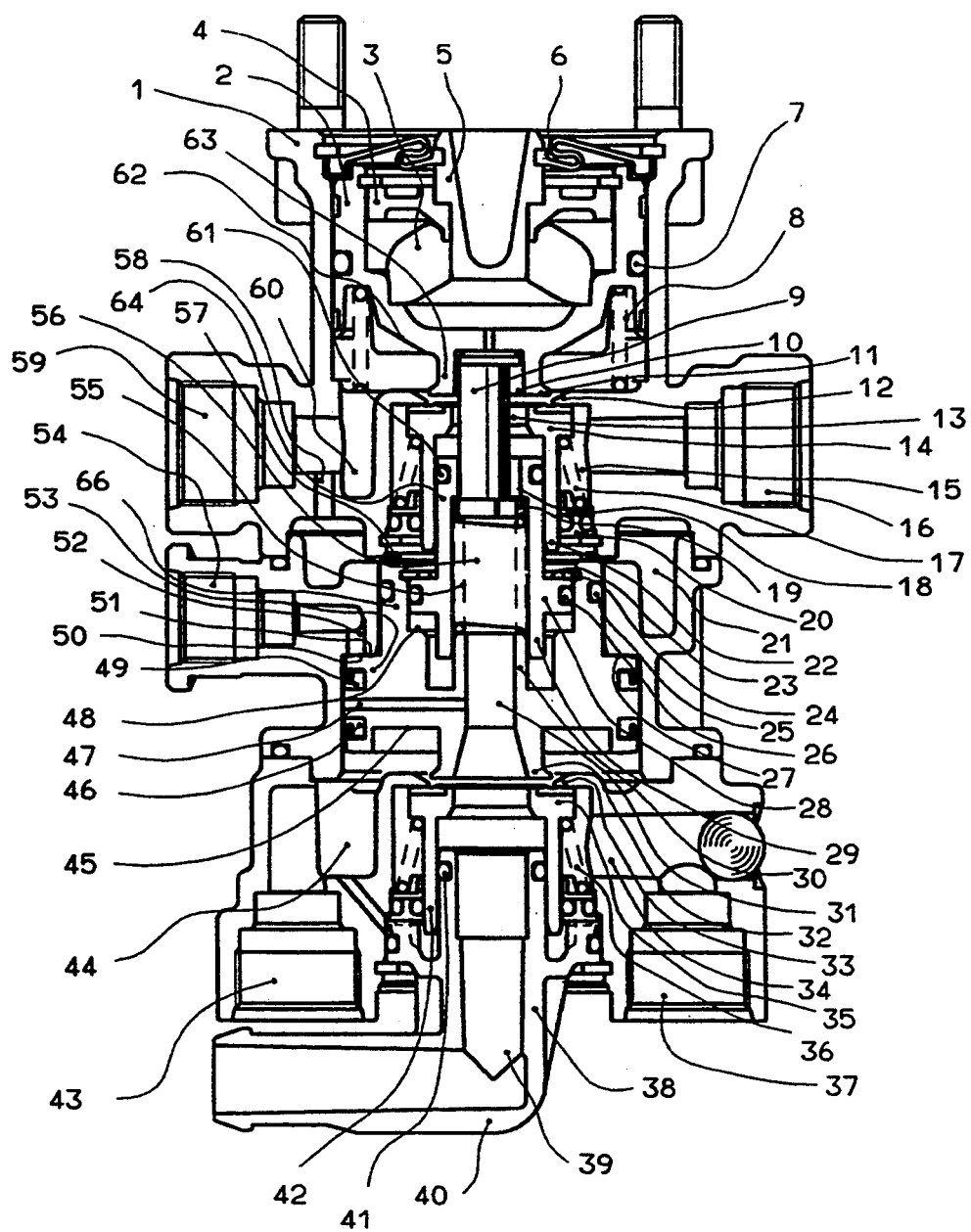
FIG. 1 shows the inventive dual circuit brake valve system.

The dual circuit brake valve shown in FIG. 1 is provided with a first valve body (14) sealed by means of a double sealing ring (20) and capable of being shifted in a longitudinal direction in a housing (1) which together with a first inlet seat (12) integrated into the housing constitutes a first inlet valve (14, 12). A first pressure inlet chamber (15) connected to a first pressure supply connection (16) can be connected to a first working chamber (60) by means of the pressure inlet valve (14, 12). The first working chamber (60) can be connected to a first brake circuit (e.g., a rear axle brake circuit) by means of a pressure connection (59).

Coaxial with the first valve body (14), a first piston (2) in the form of a stepped piston is sealed and capable of longitudinal displacement in housing (1), said first piston (2) being sealed by means of a sealing ring (7), and delimiting the first working chamber (60) with its underside which is in the form of a stepped surface (62). The stepped piston (2) is equipped with a tappet-like extension (63) which extends into the first working chamber (60) and on which a first outlet seat (11) is attached. The first valve body (14) together with the first outlet seat (11) constitute a first outlet valve (11, 14). The first valve body (14) is hollow. The first inlet valve (14, 12) and the first outlet valve (11, 14) constitute a first combined inlet and outlet valve (14, 12, 11).

In a hollow upper zone of the stepped piston (2) away from the stepped surface (62) and capable of displacement in relation to this stepped piston (2), a pressure element (4, 5), consisting of a spring plate (4) and a centerpiece (5), is installed. A stepped spring (3) is installed between the pressure element (4, 5) and the stepped piston (2). The stepped spring (3) consists in this case of a rubber spring which goes into action only in a later actuating phase of the dual circuit brake valve. It is clear that the stepped spring (3) may be designed in any other suitable manner, e.g., in the form of a screw spring. The interior of the stepped piston (2) is protected against the entry of dirt and humidity by means of a bellows-like elastic element (6) which is attached on one side to the inner wall of housing (1) and on another side to the centerpiece (5) of the pressure element (4, 5).

A spring (8) bearing with one end on a projection of the housing (1) and with another end on the stepped surface (62) of the stepped piston (2) is installed in the first working chamber (60), said spring (8) prestressing the stepped piston (2) in the direction of opening of the first outlet valve (11, 14) of the first combined inlet and outlet valve (14, 12, 11) and ensuring reliable opening of the first outlet valve (11, 14).

A second combined inlet and outlet valve (35, 33, 32) is installed coaxially to the first combined inlet and outlet valve (14, 12, 11) in the housing (1). The second combined inlet and outlet valve (35, 33, 32) includes a second valve body (35) which, together with a second inlet seat (33) constitutes a second inlet valve (35, 33) through which a second pressure inlet chamber (34) connected to a second pressure supply connection (37) can be connected to a second working chamber (44). The second working chamber (44) is assigned a pressure connection (43) leading to a second brake circuit (e.g., a front axle brake circuit).

The second valve body (35) is hollow and prestressed by a spring (36) bearing on a double sealing ring located in the housing (1) against the second inlet seat (33), i.e., in the direction of closing of the second inlet valve (35, 33). The second valve body (35) has a pipe-shaped extension (42).

A hollow knee piece (38) with a connection piece (40) serving as a cover of the housing (1) extends into the pipe-shaped extension (42) of the second valve body (35). The second valve body (35) is sealed by means of a sealing ring (41) and is capable of longitudinal displacement on the outer circumference of the knee piece (38).

Between the first combined inlet and outlet valve (14, 12, 11) and the second combined inlet and outlet valve (35, 33, 32), coaxially to these, a second piston serving as a relay piston (53) is installed so as to be capable of displacement along its longitudinal axis while being sealed by means of three sealing rings (46, 49 and 25). The relay piston (53) which is hollow delimits the second working chamber (44) with its underside which serves as a reaction surface (45). Starting at the reaction surface (45), the relay piston (53) is provided with a tappet-like extension which extends in the direction of the second valve body (35) and is not further designated, on which a second outlet seat (32) is an integral part and, together with the second valve body (35), constitutes a second outlet valve (35, 32). The second outlet valve (35, 32) forms a part of the second combined inlet and outlet valve (35, 33, 32).

In an area away from the second combined inlet and outlet valve (35, 33, 32), the relay piston (53) is designed in a stepped manner. With a smaller stepped surface of relay piston (33) designed as the first active area (57), the relay piston (53) delimits a first control chamber (21). With a larger stepped surface designed as the second active area (50), the relay piston (53) delimits a second control chamber (51). The two active areas (57) and (50) are opposed to a third active area of the relay piston (53) which serves as the reaction surface (45).

The outside diameter of the second active area (50) is equal to the outside diameter of the third active area serving as the reaction surface (45). In a manner obvious to the person schooled in the art, the outside diameter of the second active area (50) can also be smaller or greater than the outside diameter of the third active area, and in the latter case, the diameter of the first active area (57) can be smaller or greater than the diameter of the third active area or can be equal to it.

The relay piston (53) is sealed off at its outer periphery with the diameter of the first active area (57), and in the proximity of the second active area (50) by means of the earlier-mentioned encircling sealing ring (49) against the inner wall of housing (1). Between the sealing ring (46) located in the proximity of the reaction surface (45) and the sealing ring (49) located in the proximity of the second active area (50), the relay piston (53) is provided with a breathing bore (47) which is connected to a passage opening (31) in the relay piston (53) leading to the second outlet valve (35, 32).

The first working chamber (60) is connected to the first control chamber (21) via a housing channel (58) which serves as a control connection of the first control chamber (21).

The second control chamber (51) is delimited by the second active area (50) of the relay piston (53) and by a housing wall (27). The second control chamber (51) can be subjected to the pressure coming from an axle-load dependent brake force regulator (not shown) via a control connection (54).

The interior wall of the relay piston (53) which is a hollow piston is designed in a stepped manner. In the area with the greater inside diameter of the relay piston (53), a third piston (28, 29, 64) which is also designed as a hollow piston is sealed off by means of a sealing ring (26) and is capable of displacement in the direction of the longitudinal axis of the relay piston (53). The third piston (28, 29, 64) consists of a pipe-shaped body (29, 64) and an encircling projection (28) which carries the sealing ring (26). The side of the encircling projection (28) of the third piston (28, 29, 64) which faces toward the control chamber (21) serves as an active area (23) which is subjected to the brake pressure in the first brake circuit in the direction away from the stepped piston (2). The third piston (28, 29, 64) is prevented from sliding out of the recess of the relay piston (53) by a holding ring (24) which has at the same time the function of a stop for the third piston (28, 29, 64). Across from the holding ring (24) serving as a stop, on the side away from the active area (23) of the third piston (28, 29, 64), another stop (48) is provided in the relay piston (53). The first stop (48) constituted by a step in the wall of the relay piston (53) limits the stroke of the third piston (28, 29, 64) in the direction away from the first combined inlet and outlet valve (14, 12, 11) and the second stop (24) constituted by the holding ring across from the first stop (48) delimits the stroke of the third piston (28, 29, 64) in the direction toward the first combined inlet and outlet valve (14, 12, 11).

The pipe-shaped element (64) of the third piston (28, 29, 64) extends into a pipe-shaped extension (22) of the valve body (14) of the first combined inlet and outlet valve (14, 12, 11). A possible gap between the outer circumference of the pipe-shaped element (64) of the third piston (28, 29, 64) and the inner wall of the pipe-shaped extension (22) of the valve body (14) of the first combined inlet and outlet valve (14, 12, 11) is sealed by means of a sealing ring (61). The pipe-shaped end (29) of the third piston (28, 29, 64) toward the relay piston (53), and therefore the third piston (28, 29, 64) itself, is installed so as to be capable of displacement on the outer circumference of a pipe-shaped extension (30) of the relay piston (53), whereby said pipe-shaped end (29) extends into the illustrated recess of the relay piston (53).

The third piston (28, 29, 64) in the form of a hollow piston contains within it a compression spring (55) or, expressed another way, a compression spring (55) is installed inside the hollow space (56) of the third piston (28, 29, 64). The compression spring (55) bears with one end upon the ring-shaped face of the pipe-shaped extension (30) of the relay piston (53) and bears with its other end on a tappet (9) which is capable of displacement in the longitudinal direction within the hollow space of the third piston (28, 29, 64). On its side toward the compression spring (55) the tappet (9) has a projection (19) which is in contact with a projection (18) provided at the interior wall of the pipe-shaped element (64) of the third piston (28, 29, 64) and which serves as a stop. The compression spring (55) is secured in or on the relay piston (53), or is held in a secured position in relation to the relay piston (53), by means of the third piston (28, 29, 64), the tappet (9) and the pipe-shaped extension (30).

The tappet (9) extends through a recess (13) in the valve body (14) of the first combined inlet and outlet valve (14, 12, 11) in the direction of the stepped piston (2), and with its end away from the compression spring (55), it is in contact with the bottom of a recess (10) which is provided in the extension (63) of the stepped piston (2). The diameter of the tappet (9) is sized so that when the outlet valve (14, 11) of the first combined inlet and outlet valve (14, 12, 11) is opened, compressed air is able to flow from the first working chamber (60) through the recess (13) of the valve body (14), the hollow space (56) of the third piston (28, 29, 64) as well as the following passage (31) in the relay piston (53), the outlet valve (35, 32) of the second combined inlet and outlet valve (35, 33, 32), and the outlet (39) in the connection piece (40) to the atmosphere.

The operation of the dual circuit brake valve is explained in further detail below.

The first pressure supply connection (16) is connected to a first pressure supply and the pressure connection (59) is connected via an axle load-dependent brake force regulator (not shown) to pressure circuits going to the brake cylinders of the first brake circuit (e.g., the rear axle brake circuit). The second pressure supply connection (37) is connected to a second pressure supply or also to the first pressure supply. The pressure connection (43) is connected to the pressure circuits going to the brake cylinders of the second brake circuit (e.g., the front axle brake circuit).

The control connection (54) is connected to a pressure circuit carrying pressure from the axle load-dependent brake force regulator (not shown).

The pressure outlet (39) leading to the atmosphere is connected to the second outlet valve (35, 32) of the second combined inlet and outlet valve (35, 33, 32) of the brake valve device. Similarly, the pressure outlet (39) is connected via the recess (31) in the form of a passage bore in the relay piston (53), the hollow space (56) of the third piston (28, 29, 64), and the recess (65) provided between the outer circumference of the tappet (9) and the inner wall of the third piston (28, 29, 64) to the first outlet valve (14, 11) of the first combined inlet and outlet valve (14, 12, 11).

When the brake valve device is not in operation, the first inlet valve (14, 12) and the second inlet valve (35, 33) are closed. The first outlet valve (14, 11) and the second outlet valve (35, 32) are open. Thereby the brake circuits are aerated to the atmosphere, each via its assigned outlet valve.

When a brake pedal which is connected to the pressure element (4, 5) via a tappet (not shown) is actuated (actuating power), its downward movement is transmitted via the pressure element (4, 5) and the stepped spring (3) to the stepped piston (2). After overcoming the closing stroke of the first outlet valve (14, 11) the stepped piston (2) moves the first valve body (14) downward after the first outlet valve (14, 11) has closed and thereby opens the first inlet valve (14, 12). During this process, the connection between the first working chamber (60) and the atmosphere is interrupted and a connection between the first pressure inlet chamber (15) and the first working chamber (60) is established.

Compressed air flows from the first pressure supply through the first pressure supply connection (16) and the first inlet valve (14, 12) into the first working chamber (60), and from the latter continues through the pressure connection (59) into the rear axle brake zone (first brake pressure).

Simultaneously with the above-described processes the relay piston (53) is moved down by the stepped piston (2) via tappet (9) and the compression spring (55) which is in active connection with the latter in the direction of the second combined inlet and outlet valve (35, 33, 32). The outlet valve (14, 11) of the first combined inlet and outlet valve (14, 12, 11) and the outlet valve (35, 32) of the second combined inlet and outlet valve (35, 33, 32) are closed almost simultaneously as a result of these measures, while the inlet valve (14, 12) of the first combined inlet and outlet valve (14, 12, 11) and the inlet valve (35, 33) of the second combined inlet and outlet valve (35, 33, 32) are brought almost simultaneously into their open positions. Compressed air flows from the second pressure supply via the second pressure supply connection (37) and the second inlet valve (35, 33) of the second combined inlet and outlet valve (35, 33, 32) into the second working chamber (44) and from the latter via pressure connection (43) into the front axle brake circuit (second brake pressure dependent on the first brake pressure).

The first brake pressure which builds up in the first working chamber (60) simultaneously goes via channel (58) into the first control chamber (21) delimited by the first active area (57) of the relay piston (53) and acts upon the first active area (57) of the relay piston (53) and the active area (23) of the third piston (28, 29, 64).

Pressure also goes from the brake force regulator (not shown) via the control connection (54) and a channel (52) to the second active area (50) of the relay piston (53).

The first brake pressure and the pressure coming from the axle load-dependent brake force regulator serve as the control pressure for the relay piston (53).

The pressure from the control chamber (21) which acts upon the first active area (57) and upon the active area (23) of the third piston (28, 29, 64) causes the relay piston (53) and the third piston (28, 29, 64) to move further down, in the direction of the opening of the second combined inlet and outlet valve (35, 33, 32). When the pressure coming from the control chamber (21) has reached a predetermined level of pressure, the third piston (28, 29, 64) moves free from the second stop (24) and moves in the direction of the opening (39) of the second combined inlet and outlet valve (35, 33, 32). The element (28) of the third piston (28, 29, 64) comes to rest against the first stop (48) of the relay piston (53) whereby the compression spring (55) is put under tension and the tappet (9) is carried along by the projection (18) of the third piston (28, 29, 64). In the course of this process the tappet (9) detaches itself from the stepped piston (2). The active connection between the stepped piston (2) and the relay piston (53) is now suspended.

The pressure ($P_{21}$) in the first working chamber (60) and thereby also the pressure in the first brake circuit increases over the pressure ($P_{22}$) injected into the second brake circuit via the inlet valve (35, 33) of the second combined inlet and outlet valve (35, 33, 32).

This pressure increase cannot occur in the second brake circuit because the stepped piston (2) and the relay piston (53) are no longer mechanically connected. Thus, the pressure used as control pressure for the relay piston (53) coming from the control chamber (21) does not let the relay piston (53) react as rapidly to the pressure increase in the first working chamber (60) and thereby also in the control chamber (21) because of the frictional force produced by the sealing rings installed on the relay piston (53) and the spring force of the second inlet valve (35, 33).

A pressure difference $\Delta p$ between the pressure ($P_{21}$) in the first brake circuit and the pressure ($P_{22}$) in the second brake circuit is produced or increases.

As mentioned earlier, when a braking process is initiated, the pressures in the two brake circuits are virtually equal, and $\Delta p$ is virtually zero when the evolution of pressure is the same. As the braking pressure continues to build up, the greater pressure difference $\Delta p$ between the pressures in the two brake circuits appears, but the evolution of pressure in the two brake circuits remains the same, even when $\Delta p$ has increased.

Figure 2:
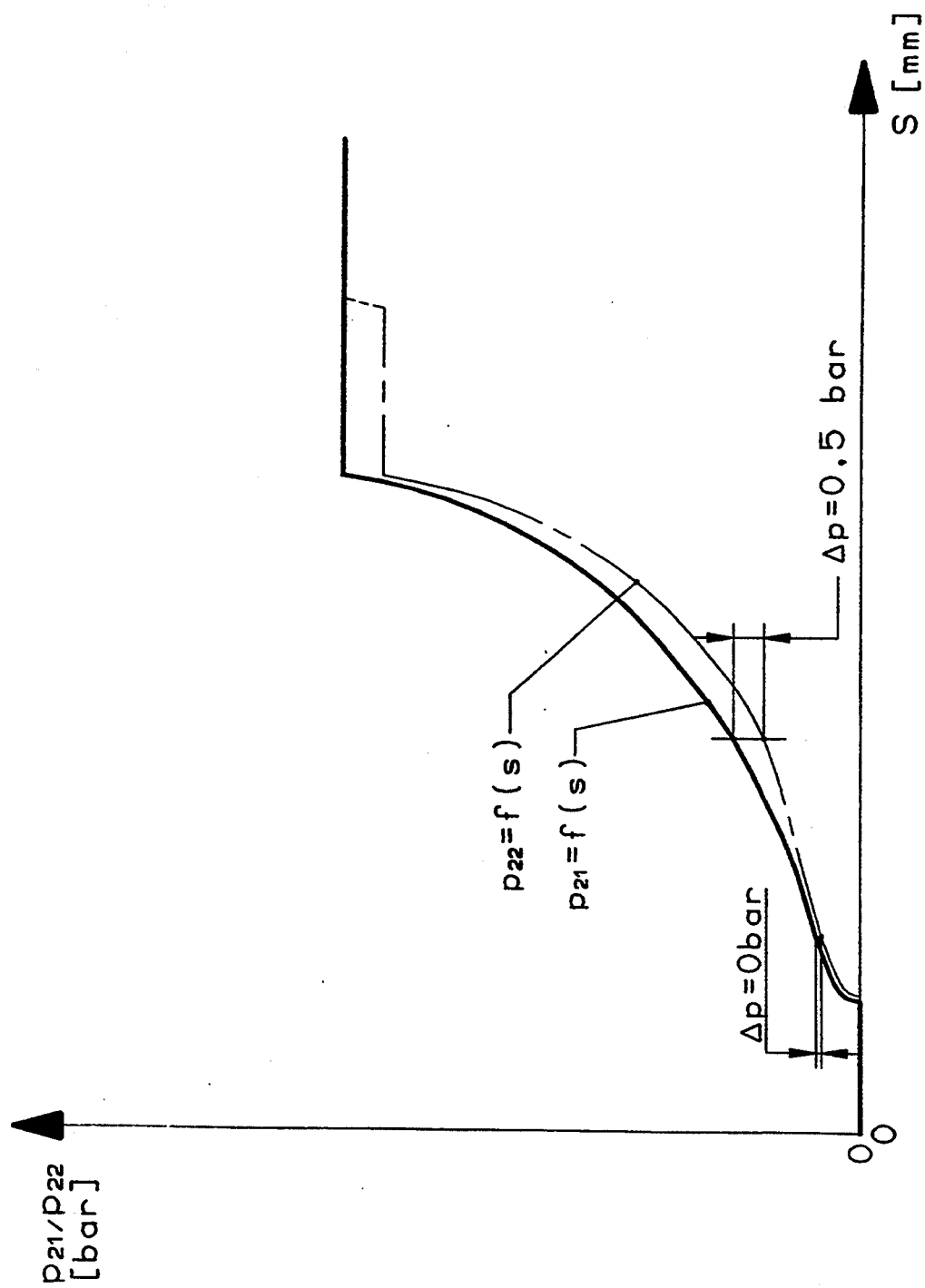
FIG. 2 shows a diagram of the evolution of pressure in the two brake circuits.

The evolution of pressure in the two brake circuits is shown in FIG. 2. In this drawing, $P_{21}$ and $P_{22}$ designate the level of pressure and f(s) indicates the path or evolution of pressure.

The curve ($P_{21}$) shows the evolution of pressure of the first brake circuit and ($P_{22}$) shows the evolution of pressure of the second brake circuit, while $\Delta p$ represents the pressure difference between the pressure of the first brake circuit and the pressure of the second brake circuit.

FIG. 2 indicates as an example that the pressure difference between the pressure in the first brake circuit and the pressure in the second brake circuit is virtually equal to zero up to a pressure of 1 bar. After a pressure of 1 bar in the two brake circuits is exceeded, a pressure increase of, e.g., 0.5 bar in the first brake circuit over the pressure in the second brake circuit appears. With the pressure difference of 0.5 bar, the pressures in the first brake circuit and the second brake circuit continue to build up, the evolution of pressure in the two brake circuits continuing to be equal. In the first brake circuit, the pressure at the end position is, for instance, 5 bar, and in the second brake circuit, the pressure at the end position is 4.5 bar.

When the force of the first braking pressure in the working chamber (60) acts upon the stepped piston (2) and an opposing force exerted by the stepped spring (3) upon the stepped piston (2) are balanced, the first outlet valve (14, 11) and the first inlet valve (14, 12) are closed. An end position has been reached.

When a balance has been established between the pressure forces acting upon the relay piston (53) via the first active area (control surface 57) of the relay piston (53) together with the active area (23) of the third piston (28, 29, 64), as well as the second active area (50) of the relay piston (53), and the pressure forces acting upon the reaction surface (45) of the relay piston (53), the second outlet valve (35, 32) and the second inlet valve (35, 33) are closed. An end position has been reached.

As mentioned earlier, the frictional forces produced by the numerous seals of the relay piston (53) and the spring (36) of the second valve (35, 33, 32) which bears on the valve body (35) in the closed position of the second inlet valve have the effect that the relay piston (53) begins to move only with an increased first braking pressure in the direction of the second valve body (35). This delay in response time is counteracted to the greatest possible extent by the compression spring (55) located in the third piston which is designed as a hollow piston and by the tappet (9) connected with these, in that a force which assists the force produced by the first brake pressure is introduced as the stepped piston (2) moves the relay piston (53) via the tappet (9) and the compression spring (55).

When the first inlet valve (14, 12) is closed and the first outlet valve (14, 11) of the first combined inlet and outlet valve (14, 12, 11) reaches the open position so that the pressure in the first working chamber (60) and therefore also in the first brake circuit is reduced, the first braking pressure is also reduced in the control chamber (21) so that the relay piston (53) moves back into its starting position, causing also the second inlet valve (35, 33) to be closed and the second outlet valve (35, 32) of the second combined inlet and outlet valve (35, 33, 32) to reach the open position. Now the pressure in the second working chamber (4) and thereby the pressure in the second brake circuit is also reduced toward the atmosphere. In the course of this event the third piston (28, 29, 64) moves up under the force of the compression spring (55), in the direction of the first combined inlet and outlet valve (14, 12, 11), until the third piston (28, 29, 64) comes to rest against the second stop (24) of the relay piston (53) and the tappet (9) against the first piston (stepped piston) (2).

The distance between the first stop (48) and the second stop (24) of the relay piston (53) is such that the tappet (9) and the stepped piston (2) remain disengaged for as long as the third piston (28, 29, 64) is held against the first stop (48) of the relay piston (53) by the first braking pressure in the control chamber (21).

The suspension of the mechanically active connection between the stepped piston (2) and the relay piston (53) makes it possible to trigger different brake pressures in both brake circuits, starting at a predetermined pressure level, with nearly identical pressure evolution for the first brake circuit and the second brake circuit.

It is of course also possible to close the control pressure connection (54) or to omit it entirely if the influence upon the pressure in the second brake circuit which is exerted by pressure from an axle load-dependent braking force regulator is relinquished.

Similarly, it is possible to design the valve direction as an advanced-control valve, whereby the control chamber (21) and the second pressure inlet chamber (34) are connected to each other by a channel. In such case it is possible to omit the second pressure supply connection (37).

The above-described valve arrangement essentially comprises a control valve and a relay valve, whereby the control valve consists of the stepped spring (3), the stepped piston (2), the first combined inlet and outlet valve (14, 12, 11) and the first pressure supply connection (16), the first pressure inlet chamber (15), the first working chamber (60) and the pressure connection (59) connected to the first brake circuit. The relay valve essentially comprises the relay piston (53), the second combined inlet and outlet valve (35, 33, 32), the second pressure inlet chamber (34), the second working chamber (44) and the second pressure connection (43) connected to the second brake circuit. The compression spring (55) is located between the first piston (2) and the second piston (53) which serves as a relay piston.

The working chamber (60) of the control valve is connected via a channel (58) to the control chamber (21), as mentioned earlier. The tappet (9) which brings the stepped piston (2) of the control valve into active connection with the relay piston (53) of the relay valve via compression spring (55) can be either a solid piece or in the form of a hollow element.

An encircling projection (28) extending in the direction of the tappet can be provided in the third piston (28, 29, 64) as a stop for the tappet, but it is also possible to provide one or several individual projections in the third piston (28, 29, 64) against which the projection (19) of the tappet (9) comes to rest.

The compression spring (55) can also be installed in such manner on the second piston (53) that it bears with one end against the second piston (53) and with its other end upon a component (9, 65) designed in the form of a tappet or spring plate and thus holds this component (9, 65) in contact with a stop of the second piston (53). If a spring plate is used instead of the tappet, it is possible to provide on the first piston (2) an extension against which the spring plate is pressed by the compression spring (55).

The third piston (28, 29, 64) need not be made in the form of a hollow piston, nor need it encircle the compression spring (55). It may be positioned at any location in proximity to the compression spring (55) in the housing of the valve arrangement and may be provided with means, e.g., an extension, which acts on the spring plate component in such manner that when the third piston (28, 29, 64) moves in the direction of the second piston (53), the component is slaved to shorten the distance between the two ends of the compression spring (55) and thus to remove the active connection between the component against which the compression spring (55) bears and the first piston (2), as is also the case with the tappet (9, 65) in the illustrated embodiment.

It is especially important for the invention that the compression spring is installed and secured on the second piston (53) between the first piston (2) and the second piston (53), and that the third piston (28, 29, 64) be provided with means (18) which act upon the component (9) in such manner that when the third piston (28, 29, 64) moves in the direction of the second piston (53), the component (9) is slaved to shorten the distance between the two ends of the compression spring (55) and thus to remove the active connection between the component against which the compression spring (55) bears and the first piston (2).

While the invention has been described by reference to specific embodiments, this was for purposes of illustration only. Numerous alternative embodiments will be apparent to those skilled in the art, and are considered to be within the scope of the invention.

We claim:

1. A dual circuit brake valve system for a motor vehicle braking system comprising
    a first brake circuit,
    a first combined inlet and outlet valve through which a first braking pressure is delivered to said first brake circuit,
    a first piston operatively connected to said first combined inlet and outlet valve which controls the delivery of said first braking pressure to said first brake circuit, said first piston being actuated by an actuating power, said first braking pressure being dependent on the magnitude of said actuating power,
    a second brake circuit,
    a second combined inlet and outlet valve through which a second braking pressure is delivered to said second brake circuit,
    a second piston operatively connected to said second combined inlet and outlet valve which controls the delivery of said second braking pressure to said second brake circuit, said second piston being actuated by said first braking pressure which serves as a control pressure therefor, said second braking pressure being dependent on said first braking pressure,
    a compression spring located and secured on said second piston so that said compression spring bears with one end upon said second piston and with a second end upon a component which is in mechanical contact with said first piston,
    a third piston disposed between said first and second pistons and having means for moving said component against the force of said compression spring, said third piston having an active area which is subject to said first braking pressure, said active area being located on a side of said third piston which faces away from said second piston.

2. Dual circuit brake valve system as in claim 1 wherein said component is a tappet.

3. Dual brake valve system as in claim 1 wherein said component is a spring plate.

4. Dual circuit brake valve system as in claim 1 wherein said first piston includes an extension which extends towards said second piston, said extension having a free end which is in contact with said component.

5. Dual circuit brake valve system as in claim 1 wherein said third piston has a hollow interior, wherein said compression spring is located inside said hollow interior of said third piston, wherein said third piston is installed within said second piston and is capable of displacement along a longitudinal axis of said second piston between first and second stops of said second piston, wherein said third piston includes means for slaving said component against the force of said compression spring, and wherein the distance between said first stop and said second stop of said second piston is such that said third piston is able to execute a stroke along said longitudinal axis of said second piston, said stroke being sized so that mechanical connection between said first piston and said second piston is suspended when said first piston is in contact with said first stop, and so that mechanical connection between said first piston and said second piston is re-established when said third piston is in contact with said second stop.

6. Dual circuit brake valve system as in claim 1 wherein said third piston comprises a pipe-shaped element and an encircling projection extending from an outer circumference of said pipe-shaped element, said pipe-shaped element including a first area which extends into a pipe-shaped extension of said first combined inlet and outlet valve, said pipe-shaped extension of said first combined inlet and outlet valve extending toward said second piston, said first area of said pipe-shaped element being sealed off against an inner wall of said pipe-shaped extension by means of a sealing ring, wherein said pipe-shaped element includes a second area extending into said second piston and being guided onto an outer circumference of a pipe-shaped projection of said second piston, and wherein a sealing element is installed between an outer circumference of said encircling projection of said third piston and a wall delimiting a passage in said second piston.

7. Dual circuit brake valve system as in claim 1 wherein said second piston delimits a control chamber having a control surface subjected to said first braking pressure, and delimits a working chamber having a reaction surface oriented in a direction opposite to said control surface.

8. Dual circuit brake valve system as in claim 7 wherein said second piston comprises a stepped piston having a ring-shaped forward surface facing toward said control chamber which serves as a first active area of said second piston, and a step which serves as a second active area of said second piston.

9. Dual circuit brake valve system as in claim 8 wherein said second piston includes a stepped passage opening with said step serving as a first stop and a securing ring across from said step serving as a second stop, and wherein said third piston is disposed within said second piston so as to be capable of displacement therein with a stroke that is limited by said first stop and said second stop.

10. Dual circuit brake valve system as in claim 9 wherein said second piston comprises a relay piston having a side which can be subjected to said first braking pressure and a side which serves as a reaction surface for said second braking pressure.

11. Dual circuit brake valve system as in claim 10 wherein an encircling projection of said third piston serves as an active area of said third piston and is subjected to pressure in said first control chamber.

12. Dual circuit brake valve system as in claim 11 wherein said control chamber and a pressure means inlet chamber are connected to each other via a channel.

13. Dual circuit brake valve system as in claim 1 further comprising a brake force regulator which subjects said second piston to a pressure coming from said brake force regulator.

* * * * *